United States Patent
Kondo et al.

(10) Patent No.: US 6,345,914 B1
(45) Date of Patent: Feb. 12, 2002

(54) SEALED ROLLING BEARING WITH CENTRIFUGAL FEATURE

(75) Inventors: Masateru Kondo; Tomoyuki Aizawa, both of Fujisawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/615,939

(22) Filed: Jul. 13, 2000

(30) Foreign Application Priority Data

Jul. 16, 1999 (JP) .......................................... H11-203545

(51) Int. Cl.[7] ................................................ F16C 33/78
(52) U.S. Cl. .................... 384/477; 384/478; 384/486
(58) Field of Search ................................ 384/477, 478, 384/484, 486, 571

(56) References Cited

U.S. PATENT DOCUMENTS

| | | | |
|---|---|---|---|
| 4,692,040 A | * 9/1987 | Ebaugh et al. | 384/484 |
| 4,702,626 A | 10/1987 | Scholl et al. | |
| 4,997,294 A | * 3/1991 | Hillmann | 384/484 |
| 5,118,206 A | 6/1992 | Otto et al. | |
| 5,362,159 A | 11/1994 | Küfner | |
| 6,227,713 B1 | * 5/2001 | Neder et al. | 384/484 |

FOREIGN PATENT DOCUMENTS

| | | |
|---|---|---|
| JP | 55-40305 | 3/1980 |
| JP | 56-158521 | 11/1981 |
| JP | 60-14933 | 4/1985 |
| JP | 61-12130 | 4/1986 |
| JP | 62-147119 | 7/1987 |
| JP | 2-2482 | 1/1990 |
| JP | 6-17824 | 1/1994 |
| JP | 7-224841 | 8/1995 |
| JP | 9-174123 | 7/1997 |
| JP | 9-329243 | 12/1997 |
| JP | 2576246 | 4/1998 |
| JP | 11-62996 | 3/1999 |
| JP | 11-166550 | 6/1999 |

* cited by examiner

*Primary Examiner*—Thomas R. Hannon
(74) *Attorney, Agent, or Firm*—Roseman & Colin LLP

(57) ABSTRACT

A sealed rolling bearing comprising inner rings which can be divided in the axial direction and have a wall portion for defining part of a seal space therebetween, outer rings which can be divided in the axial direction to define a bearing space together with the inner rings between the outer rings and the inner rings, rolling elements provided in the bearing space, end face seal members provided at the opposite ends in the axial direction of the bearing space, respectively, and an intermediate seal member provided in the seal space, and the intermediate seal member comprising a seal body which can be eccentric due to centrifugal force during rotation, and a seal which comes into contact with the wall portion for defining the part of the seal space during halt.

18 Claims, 7 Drawing Sheets

US 6,345,914 B1

SEALED ROLLING BEARING WITH CENTRIFUGAL FEATURE

FIELD OF THE INVENTION

The present invention relates to a sealed rolling bearing such as a sealed four row, tapered roller bearing used for example for a roll neck bearing in a rolling mill in the steel manufacturing equipment, particularly to a sealed rolling bearing wherein the pressure change (negative pressure) in the bearing space is refrained so as to prevent fluid such as water and foreign matter such as scale from entering the bearing space, thereby preventing the function of the seal member adjacent the end faces of the bearing from being degraded and the lubricant from being deteriorated, rust from being produced in the bearing, and the performance of the bearing from dropping.

BACKGROUND OF THE INVENTION

For the bearing which may be used in the environment where fluid such as water may splash on it, for example for the roll neck bearing of the rolling mill in the steel manufacturing equipment, the sealed rolling bearing having a seal device incorporated therein is used as disclosed in Japanese patent publications Toku Ko Sho 60-14933 and Toku Ko Sho 61-12130 etc.

FIG. 6 shows an example of the sealed rolling bearing, specifically a four row, tapered roller bearing having a seal incorporated therein. Incidentally, FIG. 6 shows only the upper half of the four row, tapered roller bearing in cross section with the shaft omitted therefrom.

The sealed roller bearing illustrated comprises two first outer rings 1, a second outer ring 2, two inner rings 3, a number of rollers 4, located in four rows in the bearing space S between the first and second outer rings 1, 2 and the inner rings 3 and a cage in each of the four rows for rotatably supporting the rollers 4, therein, so that the inner rings 3 are rotated within the first and second outer ring 1, 2. Seal holders 7 are located at the opposite ends in the axial direction of the bearing to hold an elastic seal 8 adjacent the first outer rings 1, respectively. The elastic seals 8 have lips 8a, respectively, which come into contact with the outer peripheral surface of the inner rings 3 at the opposite ends in the axial direction of the bearing. Consequently, lubricant is kept within the bearing space S, and it is possible to prevent fluid such as water and foreign matter such as scale from entering the bearing space S from outside.

A seal space V is formed at the portion where the inner rings 3 come into contact with each other, and located adjacent the inner diameter surface of the inner rings 3. The seal space V may be located adjacent the outer diameter surface of the inner rings 3.

An intermediate seal member 9 is incorporated within the seal space V. This intermediate seal member 9 is to prevent fluid such as water and foreign matter such as scale from entering the bearing space S for example during mounting and dismounting of a roll (not shown).

The intermediate seal member 9, for example shown in FIG. 7(a), comprises a core metal 9a for shape-keeping and an elastic member 9b for sealing in the seal space V. The intermediate seal member 10, shown in FIG. 7(b), comprises a seal body 10a having a base portion and a leg portion in a T-shape in cross section and an elastic member 10b provided on the inner diameter side of the base portion of the seal body 10a, wherein the shape of the seal space V is different, but its function is substantially the same to that of FIG. 7(a).

There is a problem, however, in the prior art sealed rolling bearing as mentioned above that it could not sufficiently prevent the entering of water etc. under a condition of large temperature change.

For example, in the case where the sealed rolling bearing is used as a roll neck bearing for rolling mill in the steel manufacturing equipment, the sealed rolling bearing supports a roll the rotation number (rpm) of which frequently changes.

Specifically, the high speed rotation, low idling rotation and stoppage are repeated in the roll, so that the temperature in the bearing space S of the sealed rolling bearing changes corresponding to the respective conditions. Accordingly, expansion and contraction of the air etc. within the bearing space S are repeated, and the air in the space which has expanded at a higher temperature escapes through the elastic seals 8 at the end faces of the bearing, and then the bearing, space S of the sealed rolling bearing is placed under negative pressure at a lower temperature.

Moreover, in the condition where water exists more or less within the interior, at the inside temperature of 100° C. or higher, the water becomes steam in expansion, and upon temperature drop, a large negative pressure is produced.

The negative pressure within the bearing space S accelerates wear of the elastic seals 8 to worsen the function of the elastic seals 8. Accordingly, fluid such as water and foreign matter such as scale can enter the bearing space S through the elastic seals 8. Consequently, problems may be produced, e.g. lubricant is deteriorated and rusting occurs in the bearing, resulting in the premature drop in bearing performance.

SUMMARY OF THE INVENTION

The present invention is invented taking into consideration the above mentioned situation.

An objective of the present invention is to provide a sealed rolling bearing wherein by refraining the pressure change (negative pressure) within the bearing space, fluid such as water and foreign matter such as scale are prevented from entering the bearing space, so that the function drop of the seal member adjacent the end faces of the bearing, the deterioration of lubricant, the rusting in the bearing, the degradation in bearing performance are prevented.

DETAILED DESCRIPTION OF THE PREFERRED EMBODIMENTS

Figure 1:
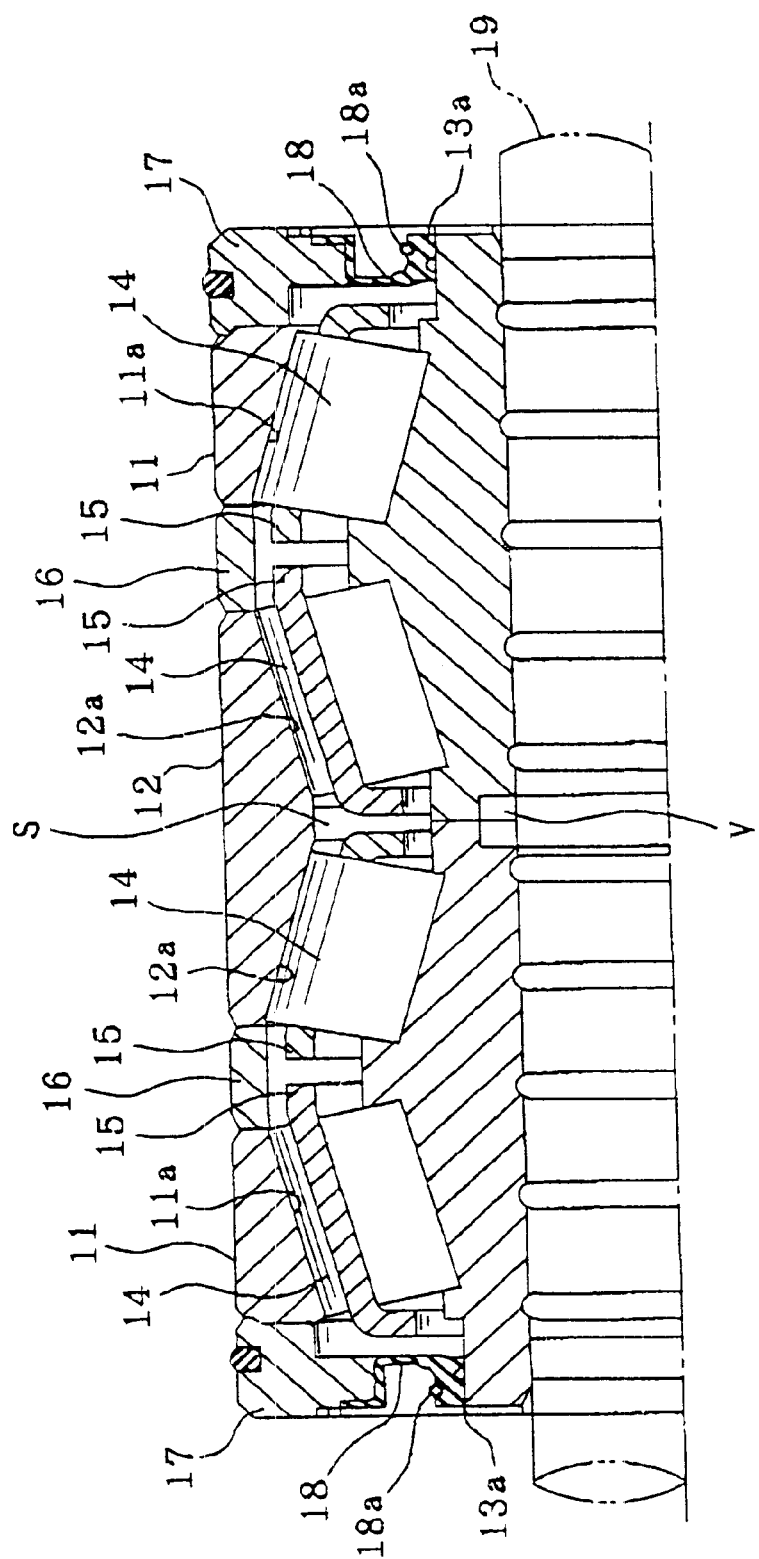
FIG. 1 is a vertical cross sectional view of a structure in one half of the rolling bearing according to a first embodiment of the present invention.

In order to achieve the objective as mentioned above, the sealed rolling bearing of the present invention basically comprises outer rings, inner rings, such that a seal space is defined partly by an inner wall portion of the inner rings, rollers located in the bearing space between the outer rings and the inner rings to rotate the inner rings and outer rings relative to each other, end face seal members located at either end in the axial direction of the bearing space, and an intermediate seal member located in the seal space to seal the bearing space.

The sealed rolling bearing of the present invention is characterized in that the intermediate seal member comprises a seal body having eccentricity that it becomes eccentric due to centrifugal force during rotation, and a tight seal portion which is tightly engaged with the wall portion partly defining the seal space when it is halted.

Thus, according to the present invention, the seal body of the intermediate seal member becomes eccentric due to the centrifugal force upon rotation of the rotatable shaft, the tight seal portion is separated from the wall portion partly defining the seal space to degrade the seal function. As a result, the bearing space is open to the ambient air to avoid the negative pressure in the bearing space. Consequently, fluid such as water and foreign matter such as scale are prevented from entering the bearing space, so that the function degradation of the seal member adjacent the end faces of the bearing, the deterioration of lubricant, the rusting in the bearing, the drop in bearing performance are prevented.

When the rotatable shaft is halted, the tight seal portion of the intermediate seal member comes into tight contact with the wall portion partly defining the seal space, and therefore for example upon mounting and dismounting of the roll, fluid such as water and foreign matter such as scale are prevented from entering the bearing space.

Some embodiments of the present invention are detailed referring to the drawings.

FIG. 1 a cross sectional view of a four row, tapered roller bearing having seals as an embodiment of the sealed rolling bearing according to the present invention. Incidentally, FIG. 1 shows only the upper half of the four row, tapered roller bearing in vertical cross section.

The four row, tapered roller bearing with seals illustrated in FIG. 1, referred to as sealed rolling bearing hereinafter, comprises two first outer rings 11, a second outer ring 12, two inner rings 13, a number of tapered rollers 14, in four rows located between the first and second outer rings 11, 12 and the inner rings 13, and cages 15 for rotatably supporting the tapered rollers 14, respectively. The first and second outer rings 11, 12, and two inner rings can be divided from each other in the axial direction. Outer ring spacers 16 are provided between the second outer ring 12 and the first outer rings 11, respectively. A seal holder 17 is provided at either end of the bearing adjacent the outer rings 11, respectively. And, an end face seal member 18 is supported by the seal holders 17, respectively.

The first outer rings 11 is of a single row type and located at the axially opposite ends of the bearing, and the second outer ring 12 is of a double row type and located between the first outer rings 11, thereby forming an outer ring assembly. The second outer ring 12 is in the shape of two single-row outer rings connected to each other. Tapered surfaces 11a, 12a are formed on the inner peripheral side of the first and second outer rings 11, 12.

The inner rings 13 in a pair are juxtaposed in the axial direction, thereby forming an inner ring assembly. The outer peripheral side of the inner rings 13 corresponds to the tapered surfaces 11a, 12a of the first and second outer rings 11, 12 to define the bearing space S surrounded by the tapered surfaces 11a, 12a.

A roll shaft 19 (shown by dotted lines) is loosely fitted into the inner rings 13. Specifically, the inner peripheral surfaces of the inner rings 13 are fitted onto the outer peripheral surface of the roll shaft 19 with a slight clearance therebetween.

The axial opposite ends of the inner ring assembly are formed with an extension portion extending longer than those of the outer ring assembly. The extension portion is formed with a lip sliding surface 13a with which the lip 18a of the end face seal members 18 comes into contact.

The tapered rollers 14, which are the rolling elements, are disposed in the bearing space S to come in contact with the outer peripheral surfaces of the inner rings 13 and with the tapered surfaces 11a, 12a of the first and second outer rings 11, 12. The tapered rollers 14 are respectively rotated in a predetermined direction as the inner rings 13 are rotated corresponding to the rotation of the shaft of a roll 19, whereby the inner rings 13 are smoothly rotated with reference to the first and second outer rings 11, 12.

The cages 15 are formed in an annular shape, and four of them are disposed in the bearing space S as illustrated. Thus, a number of tapered rollers 14 are rotatably supported in the circumferential direction in each of the cages 15.

The outer ring spacers 16 are formed in an annular shape, and interposed between the double-row, second outer ring 12 and the single-row, first outer ring 11 on the tip end side (left in FIG. 1), and between the double-row, second outer ring 12 and the single-row, first outer ring 11 on the base end side (right in FIG. 1), respectively.

The seal holders 17 are provided at the tip end portion (left in FIG. 1) of the first outer ring 11 on the tip end side, and at the base end portion (right in FIG. 1) of the outer ring 11 on the base end side, respectively, and an end face seal member 18 is kept on the inner peripheral side of the seal holders 17, respectively.

The end face seal members 18 are kept on the inner peripheral side of the seal holders 17, respectively, and have lips 18a to come into contact with the lip sliding surfaces 13a of the inner rings 13, whereby the bearing space S of the sealed rolling bearing is sealed.

In addition, a seal space V is formed on the inner diameter surface side of the inner rings 13 between the pair of inner rings 13 and defined by a wall portion of the inner ring 13 and part of the shaft of the roll 19 (FIG. 1). Incidentally, the seal space V can be formed on the outer diameter surface side of the inner rings 13.

In this embodiment, an intermediate seal member 20 (not shown in FIG. 1) is provided within the seal space V. The intermediate seal member 20 comprises a seal body 30 which has eccentricity, specifically which becomes eccentric due to centrifugal force during rotation of the roll 19, and a tight seal portion 40 which is tightly engaged with the wall portion for partly defining the seal space V when the roll 19 is halted.

Since the seal body 30 of the intermediate seal member 20 becomes eccentric due to centrifugal force during rotation of the roll 19 as mentioned above, the tight seal portion 40 can not afford to keep the interference at a portion of the circumference with reference to the wall portion for partly defining the seal space V, and is separated at that portion from the wall portion to degrade the seal function. As a result, the bearing space S is open to the ambient air to prevent the interior of the bearing space S from being placed under negative pressure. Accordingly, fluid such as water and foreign matter such as scale are prevented from entering the bearing space S, and the function drop of the end face seal members 18, the deterioration of lubricant, the rusting in the bearing, the degradation in bearing performance are prevented.

In addition, during the halt of the roll 19, since no centrifugal force is exerted on the tight seal portion 40 of the intermediate seal member 20, the tight contact with the wall portion for partly defining the seal space V and therefore the seal function are restored. Accordingly, fluid such as water and foreign matter such as scale are prevented from entering the bearing space S for example during mounting and dismounting of the roll 19.

FIG. 2(a) to FIG. 2(d) are cross sectional views to show an example of the tight seal portion 40 of the intermediate seal member 20.

Through FIG. 2(a) to FIG. 2(d), the tight seal portion 40 is formed by a ring-shaped elastic seal member such as rubber. So long as the elastic seal has inherent seal performance and required rigidity, it can take any shape such as O-ring, D-ring made from elastic and plastic materials.

Figure 2:
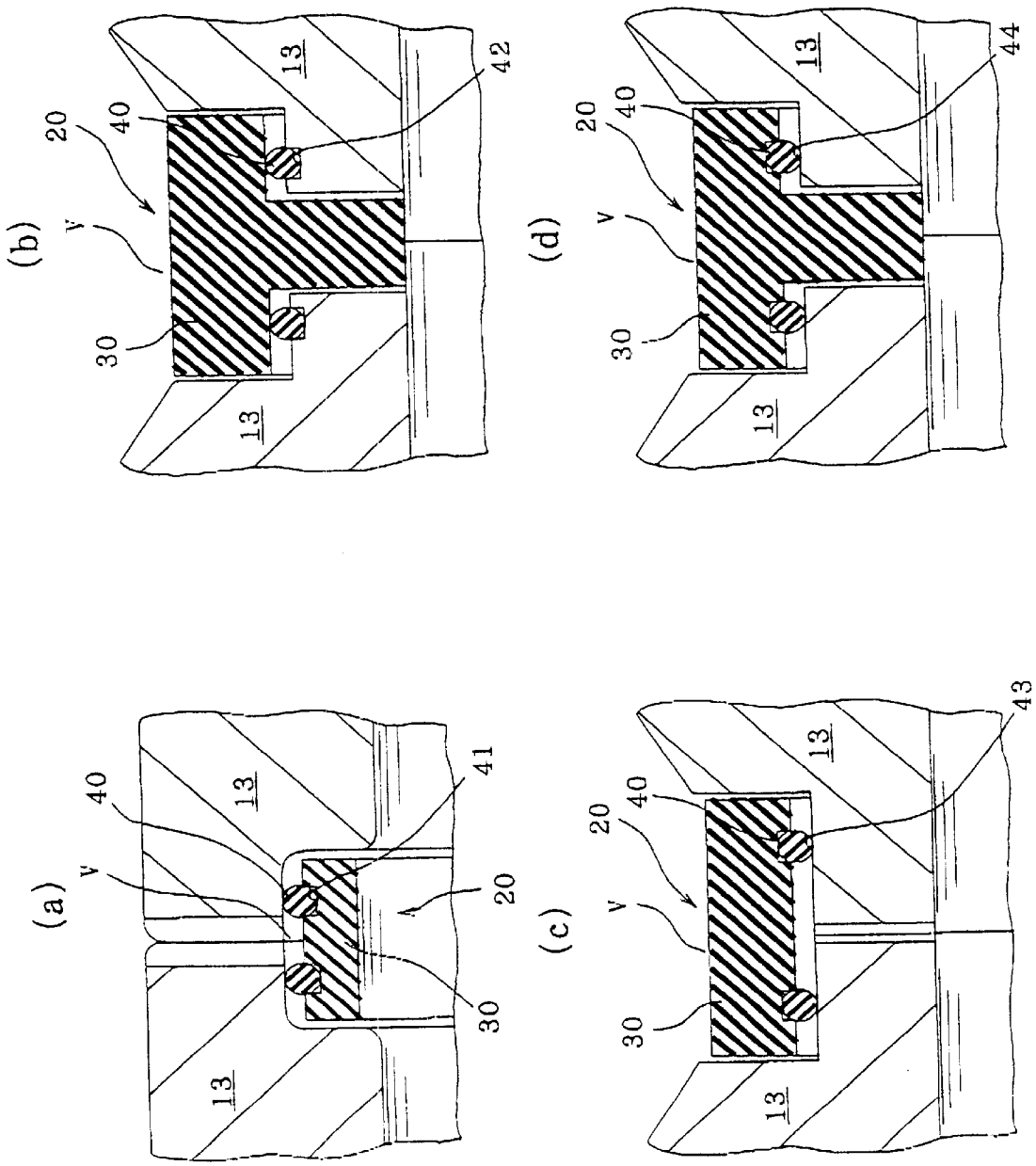
FIG. 2(a) to FIG. 2(d) are a cross sectional view to show an example of the tight seal portion of the intermediate seal member.

In FIG. 2(a), the seal space V is formed on the inner diameter surface side of the pair of inner rings 13, and the tight seal portion 40 is formed by ring-shaped elastic seal members such as rubber. In this embodiment, the seal body 30 is provided within a recessed portion formed on the inner diameter surface side of the contact surface portions through which the pair of inner rings 13 come into contact with each other, and the seal body 30 is formed with recessed portions 41 on the radially outer side thereof, and an elastic member is located in the recessed portions 41, respectively, to be tightly engaged with the wall portion for defining part of the seal space V.

In FIG. 2(b), the seal space V, in a different shape from and with substantially the same function as that of FIG. 2(a), is formed on the outer diameter surface side of the pair of inner rings 13, and the tight seal portion 40 is formed by ring-shaped elastic seal members such as rubber. In this embodiment, the seal body 30 is provided between the pair of inner rings 13, and formed with a base portion and a leg portion in a T-shape in cross section. Recessed portions 42 are formed adjacent the inner rings 13, respectively, on the radially inner side of the base portion of the seal body 30, and an elastic member is located in the recessed portions 42, respectively.

In FIG. 2(c), similar to FIG. 2(b), the seal space V is formed on the outer diameter surface side of the pair of inner rings 13, and the tight seal portion 40 is formed by ring-shaped elastic seal members such as rubber. In this embodiment, the seal body 30 is provided within a recessed portion formed on the outer diameter surface side of the pair of inner rings 13, and formed with recessed portions 43 on the radially inner side of the seal body 30, and an elastic member is located in the respective recessed portions 43.

In FIG. 2(d), similar to FIG. 2(b), the seal space V is formed on the outer diameter surface side of the pair of inner rings 13, and the tight seal portion 40 is formed by ring-shaped elastic seal members such as rubber. In this embodiment, the seal body 30 is provided between the pair of inner rings 13, and formed with a base portion and a leg portion in a T-shape in cross section. Recessed portions 44 are formed on the radially inner side of the base portion, respectively, and an elastic member is located in the respective recessed portions 44.

Figure 3:
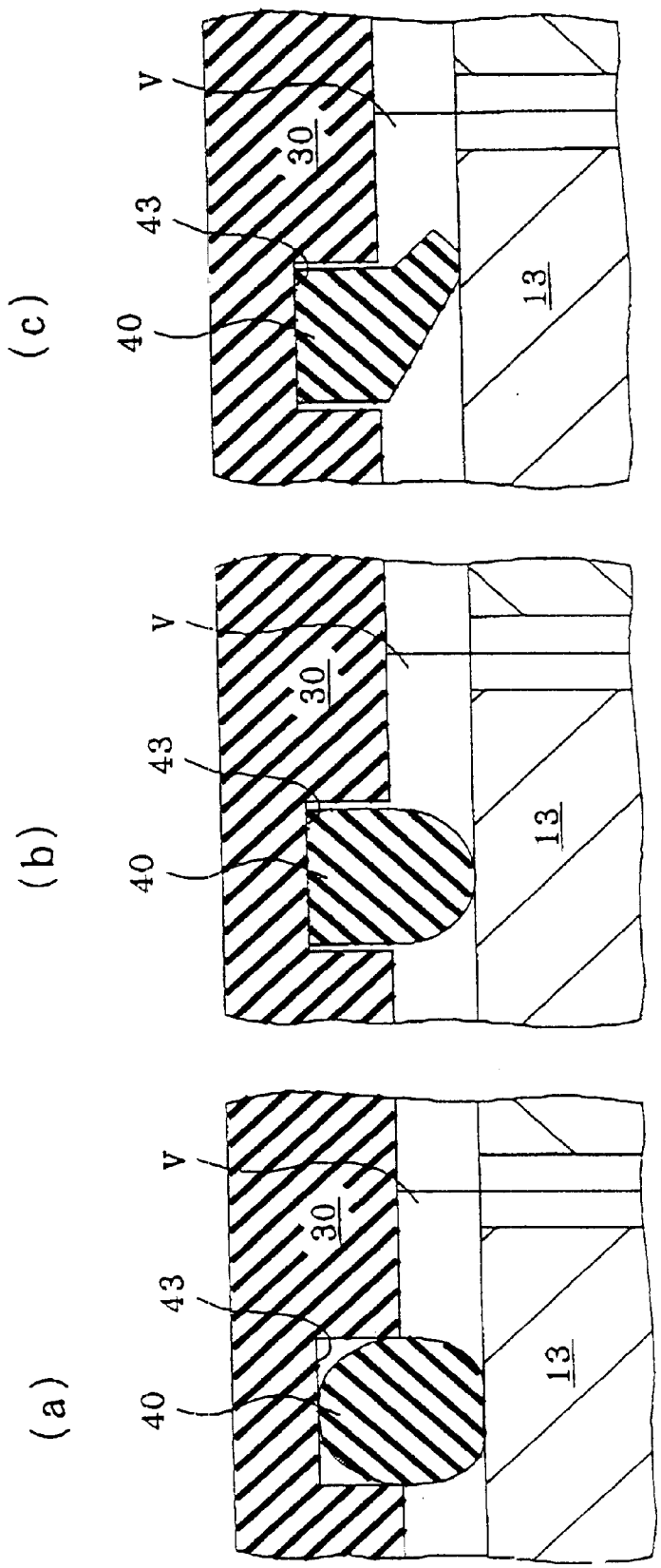
FIG. 3(a) to FIG. 3(c) are a cross sectional view to show an example of the elastic seal member for the tight seal portion applied to the intermediate seal member of FIG. 2(c).

FIG. 3(a) to FIG. 3(c) are cross sectional views to show an example of the elastic seal member for use in the tight seal portion 40 applied to the intermediate seal structure as shown in FIG. 2(c), although the parts relation is illustrated up side down. Incidentally, these examples of the elastic seal member can be applied to another intermediate seal structure of FIG. 2(a) to FIG. 2(d).

In FIG. 3(a), the elastic seal portion for the tight seal member 40 is formed in an O-ring made of rubber etc. In FIG. 3(b), the elastic seal portion for the tight seal member 40 is formed in an D-ring made of rubber etc. In FIG. 3(c), the elastic seal portion for the tight seal member 40 is formed in an elastic member having a flexible lip 45.

Figure 4:
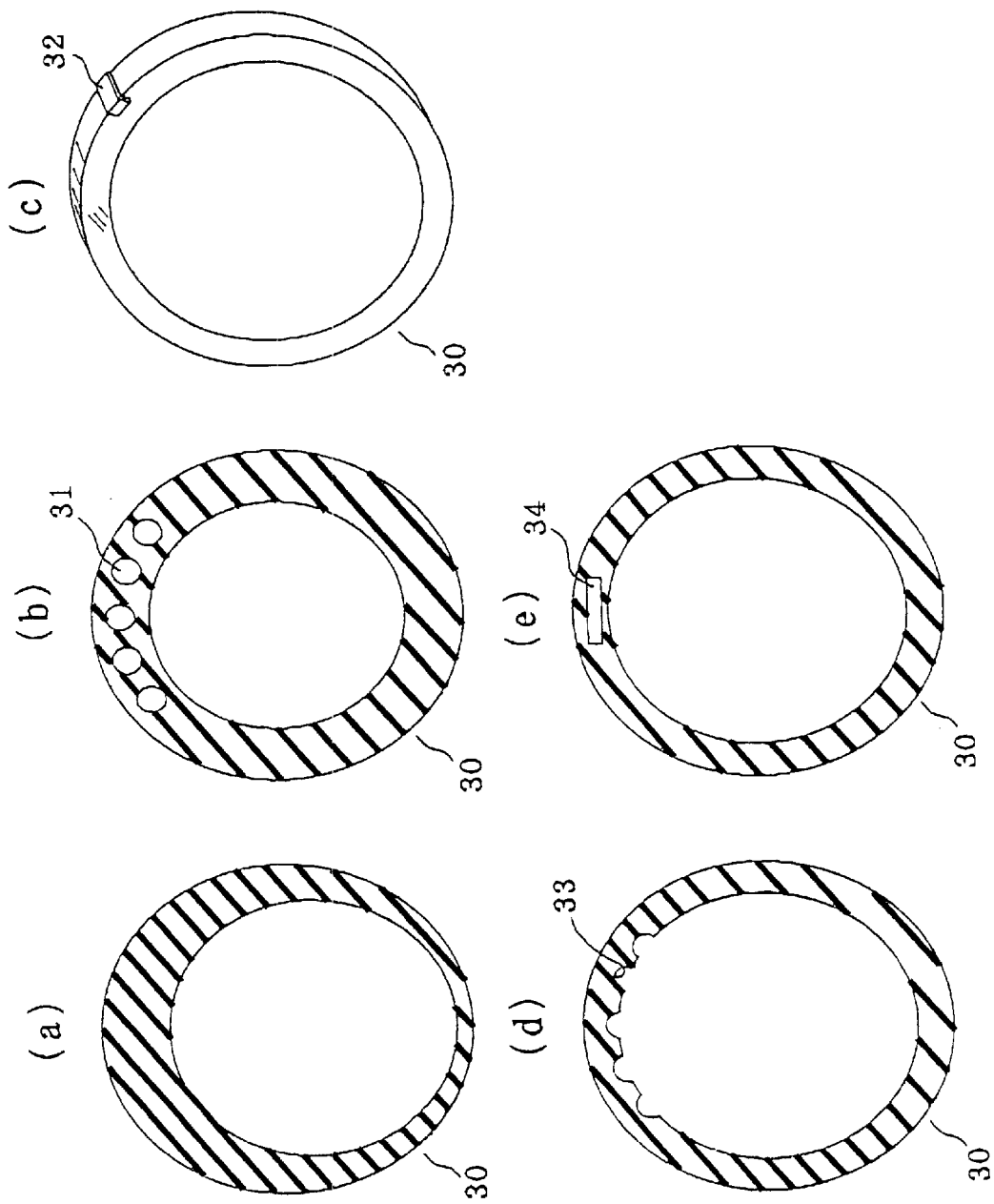
FIG. 4(a) to FIG. 4(e) (except for FIG. 4(c)) are a cross sectional view to show an example of the seal body for the intermediate seal member, and FIG. 4 (c) is a perspective view of the example.

FIG. 4(a) to FIG. 4(e)(except for FIG. 4(c)) are cross sectional views to show an example of the seal body 30 for the intermediate seal member 20, and FIG. 4 (c) is a perspective view.

In FIG. 4(a), the seal body 30 is formed uneven in material thickness such that a portion of the seal body 30 in the circumferential direction is thicker than the other portion, and thus provided with eccentricity.

In FIG. 4(b), the seal body 30 is formed such that a portion of the seal body 30 in the circumferential direction is formed with holes 31, and thus provided with eccentricity.

In FIG. 4(c), the seal body 30 is formed such that a portion of the seal body 30 in the circumferential direction is provided with weights 32 such as metal etc. mounted thereto, and thus provided with eccentricity.

In FIG. 4(d), the seal body 30 is formed such that a portion of the seal body 30 in the circumferential direction is formed with grooves 33, and thus provided with eccentricity.

In FIG. 4(e), the seal body 30 is formed such that a portion of the seal body 30 in the circumferential direction is provided with weights 34 such as metal etc. embedded therein, and thus provided with eccentricity.

Incidentally, the amount of eccentricity in the seal body 30 is set at any value by adjusting the material thickness, holes, weights etc. or the rigidity of the elastic seal member.

FIG. 5(a) to FIG. 5(d) are cross sectional views to show an example of the intermediate seal member 20.

Figure 5:
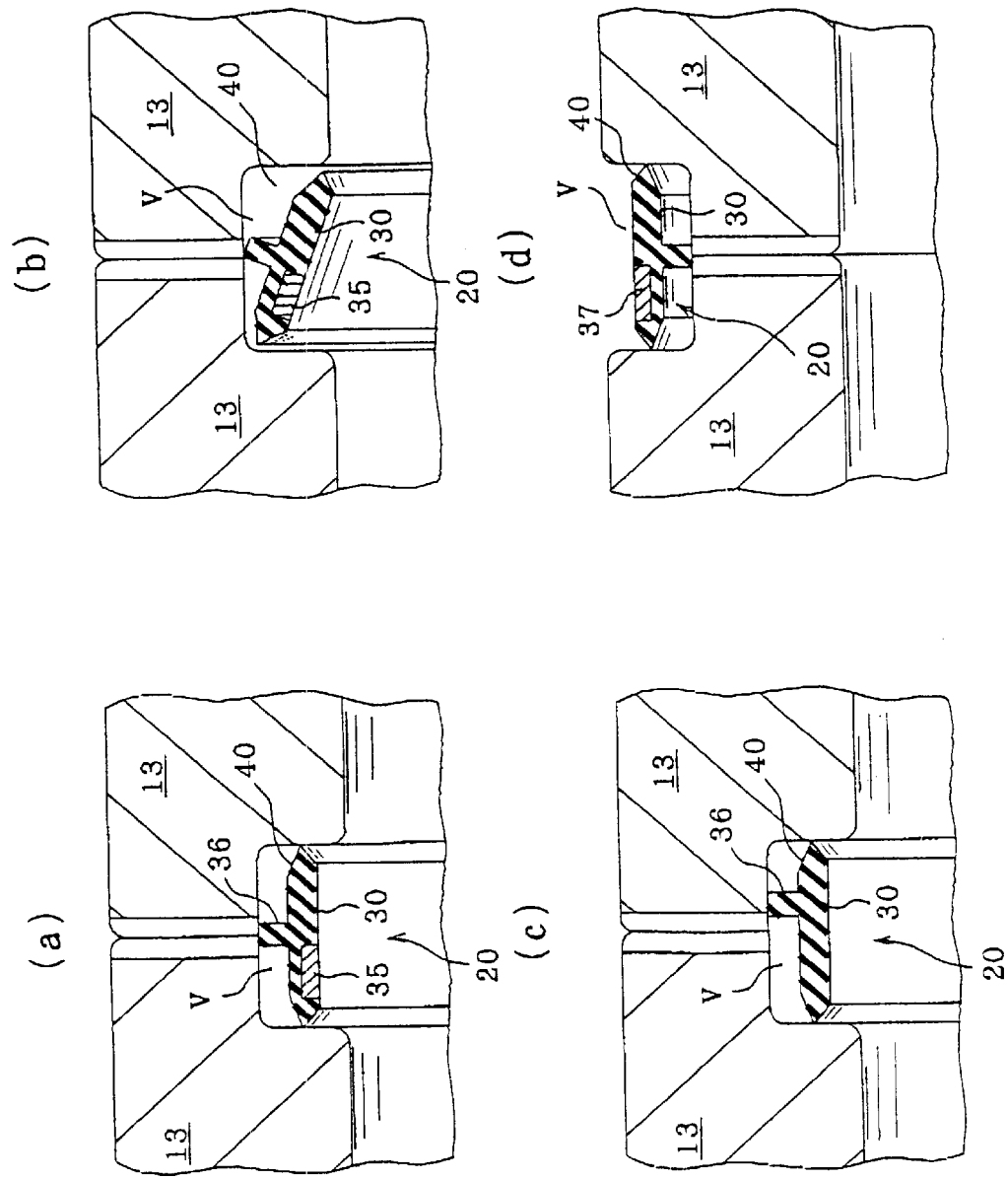
FIG. 5(a) to FIG. 5(d) are a cross sectional view to show an example of the intermediate seal member.
Figure 6:
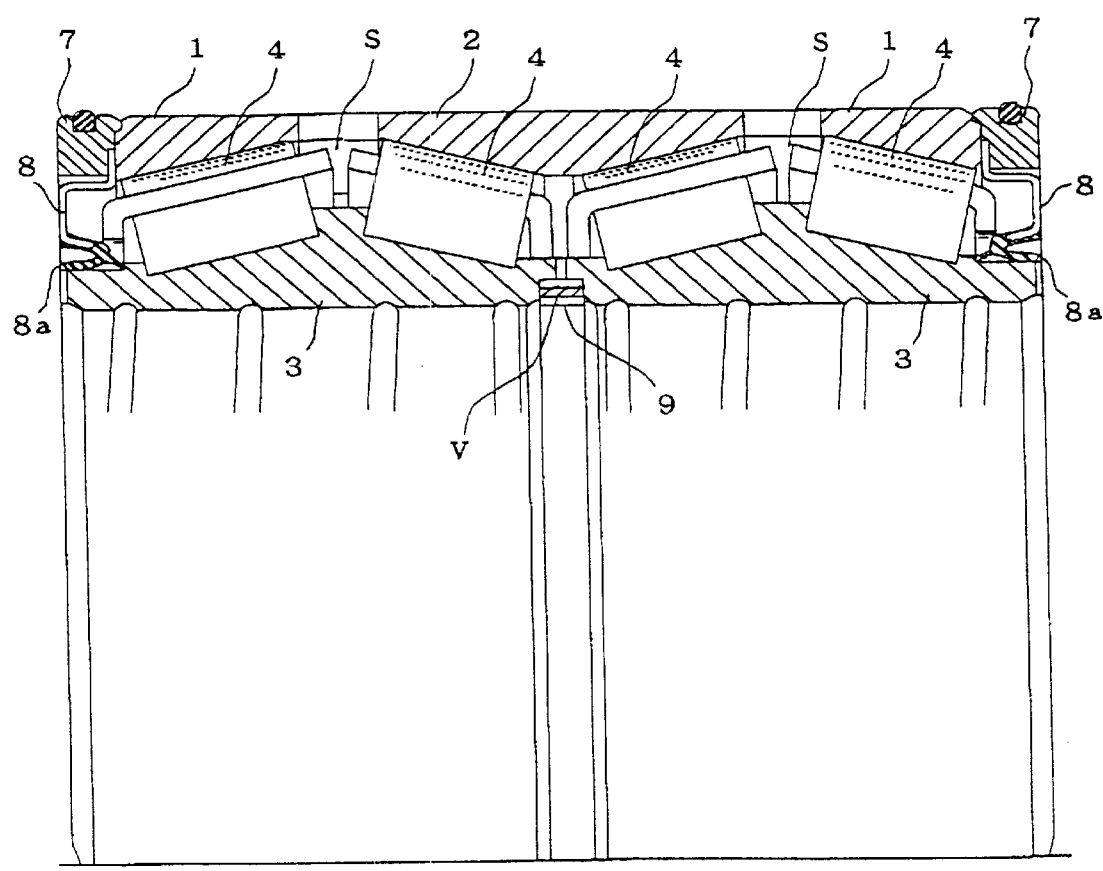
FIG. 6 is a cross sectional view to show a structure in one half of the conventional sealed rolling bearing.
Figure 7:
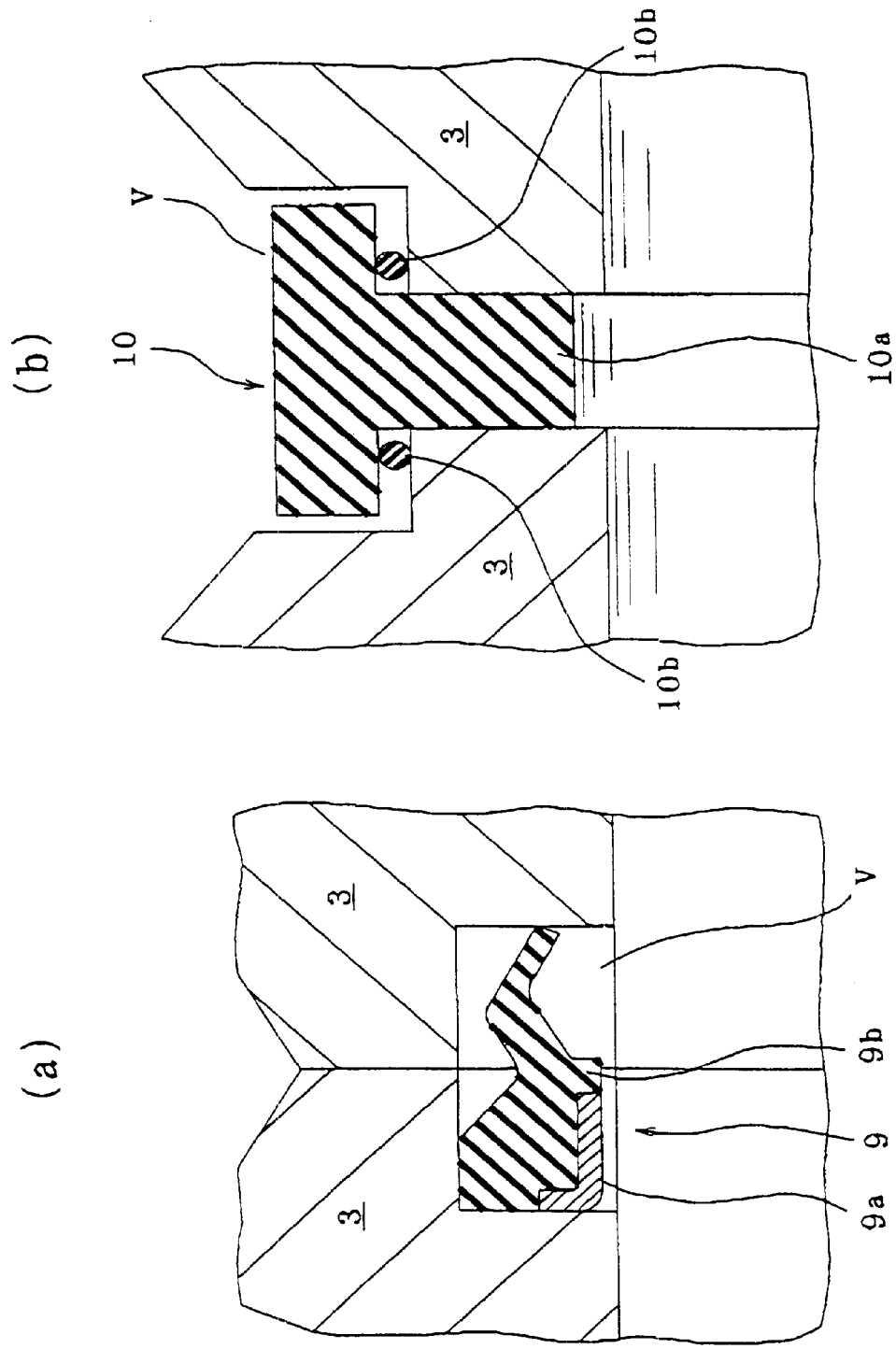
FIG. 7(a) and FIG. 7(b) are a cross sectional view of an example of the conventional intermediate seal member, respectively.

In FIG. 5(a), the seal space V is formed on the inner diameter surface side of the pair of inner rings 13, and the seal body 30 is provided within the seal space V on the inner diameter surface side of the contact surface portions through which the pair of inner rings 13 come into contact with each other, and formed with a base portion and a leg portion in a T-shape in cross section to have a fulcrum 36 in the leg portion in contact with the inner diameter surface of the inner rings 13 at the contact surface portions. The weight 35 such as a metal for eccentricity is provided in the base portion to be displaced in the axial direction, not in the circumferential direction. The roll shown in FIG. 5(a) is halted, and the base portion of the seal body 30 is formed with a tip end for the tight seal portion 40 at the either end thereof, such that the tight seal portion 40 comes into tight contact with the wall portion for defining part of the seal space V. On the other hand, while the roll is rotating, as shown in FIG. 5(b), the seal body 30 becomes eccentric due to the centrifugal force exerted on the weight 35, so that either tip end for the tight seal portion is separated from the wall portion for defining part of the seal space V to drop the seal function, whereby the negative pressure in the bearing space S is prevented from being produced.

In FIG. 5(c), the seal space V is formed on the inner diameter surface side of the pair of inner rings 13, and the seal body 30 is provided within the seal space V on the inner diameter surface side of the contact with each other, and formed with a base portion and a leg portion in a T-shape in cross section to have a fulcrum 36 in the leg portion in contact with the inner diameter surface of one of the inner rings 13 (right one in FIG. 5(c)). The fulcrum 36 for eccentricity is provided to be displaced in the axial direction, not in the circumferential direction.

In FIG. 5(d), on the contrary with respect to FIG. 5(a), the seal space V is formed on the outer diameter surface side of the pair of inner rings 13, and the seal body 30 is provided within the seal space V on the outer diameter surface side of the contact surface portions through which the pair of inner rings 13 come into contact with each other, and formed with a base portion and a leg portion in a T-shape in cross section to have a fulcrum 36 in the leg portion in contact with the inner diameter surface of the inner rings 13 at the contact surface portions. The weight 37 such as a metal for eccentricity is provided on the radially outer side of the base portion of the seal body 30 to be displaced in the axial direction (left in FIG. 5(d)). The tight seal portion 40 is comprised of opposite tip ends of the base portion of the seal body 30.

With the sealed, four row, tapered roller bearing for use in the roll neck bearing of the rolling mill in the steel manufacturing equipment, the bearing is incorporated in the roll while the roll is rotating, and therefore fluid such as water and foreign matter such as scale rarely come from the intermediate seal portion. Accordingly, even if the seal function during rotation is deteriorated as in the present embodiment, no particular problems are caused. On the other hand, the roll is frequently removed from the bearing for roll grinding process etc. where the inner diameter surface of the inner ring is exposed. With respect to this, in the present embodiment, the tight seal portion of the intermediate seal member prevents the fluid such as water and foreign matter such as scale from entering therein. Accordingly, the present embodiment is outstandingly advantageous from the point of view on the use environment.

The present invention can be modified in various forms, and should not be limited to the examples as mentioned above.

As explained above, according to the present invention, during rotation of the rotatable shaft, the seal body of the intermediate seal member becomes eccentric due to the centrifugal force thereon, so that the tight seal portion is separated from the wall portion for defining part of the seal space to degrade the seal function. As a result, the bearing space is open to the ambient air to prevent the negative pressure from being produced in the bearing space. Consequently, fluid such as water and foreign matter such as scale are prevented from entering the bearing space, so that the function degradation of the seal member adjacent the end faces, the deterioration of lubricant, rusting, the drop in bearing performance are prevented.

When the rotatable shaft is halted, the tight seal portion of the intermediate seal member comes into tight contact with the wall portion for defining part of the seal space, and therefore for example upon mounting and dismounting of the roll, fluid such as water and foreign matter such as scale are prevented from entering the bearing space.

What is claimed is:

1. A sealed rolling bearing comprising inner rings which can be divided in the axial direction and have a wall portion for defining part of a seal space therebetween, outer rings which can be divided in the axial direction to cooperate with the inner rings to define a bearing space between the outer rings and the inner rings, rolling elements provided in the bearing space, end face seal members provided at the opposite ends in the axial direction of the bearing space, respectively, and an intermediate seal member provided in the seal space, and the intermediate seal member comprising a seal body which can be eccentric due to centrifugal force during rotation, and a seal which comes into contact with the wall portion for defining the part of the seal space during halt.

2. The sealed rolling bearing of claim 1, wherein the inner rings in a pair having a contact face through which the inner rings are engaged with each other, the seal space is formed on the inner diameter surface side of the inner rings, a recessed portion is formed adjacent the contact surfaces on the inner diameter surface side of the inner rings, and the seal body is provided in the recessed portion.

3. The sealed rolling bearing of claim 2, wherein a recessed portion is formed on the radially outer side of the seal body, and the seal is provided in the recessed portion.

4. The sealed rolling bearing of claim 2, wherein the seal body is formed with a base portion and a leg portion in a T-shape in cross section and has a fulcrum in the leg portion in contact with the inner diameter surface of the inner rings, and the seal is provided on either side of the seal body.

5. The sealed rolling bearing of claim 4, wherein the seal body is provided with a weight in the axial direction.

6. The sealed rolling bearing of claim 4, wherein the fulcrum of the seal body is displaced axially.

7. The sealed rolling bearing of claim 1, wherein the seal space is formed on the outer diameter surface side of the inner rings in a pair, the seal body is provided between the inner rings and formed with a base portion and a leg portion in a T-shape in cross section, a recessed portion is formed on the inner rings adjacent a radially inner portion of the base portion of the seal body, and the seal is provided in the recessed portion.

8. The sealed rolling bearing of claim 1, wherein the inner rings in a pair having a contact face through which the inner rings are engaged with each other, the seal space is formed on the outer diameter surface side of the inner rings, and the seal body is provided in the seal space, and a recessed portion is formed on a radially inner portion of the seal body, and the seal is provided in the recessed portion.

9. The sealed rolling bearing of claim 1, wherein the seal space is formed on the outer diameter surface side of the inner rings in a pair, the seal body is provided between the inner rings and formed with a base portion and a leg portion in a T-shape in cross section, a recessed portion is formed on a radially inner portion of the base portion of the seal body, and the seal is provided in the recessed portion.

10. The sealed rolling bearing of claim 1, wherein the seal is an O-ring.

11. The sealed rolling bearing of claim 1, wherein the seal is an D-ring.

12. The sealed rolling bearing of claim 1, wherein the seal is made of an elastic member having a flexible lip.

13. The sealed rolling bearing of claim 1, wherein the seal body has a uneven material thickness such that a portion of the seal body in the circumference direction is thicker that the other portion.

14. The sealed rolling bearing of claim 1, wherein the seal body is made such that a portion of the seal body in the circumference direction is formed with holes.

15. The sealed rolling bearing of claim 1, wherein the seal body is made such that a portion of the seal body in the circumference direction is provided with a weight mounted thereto.

16. The sealed rolling bearing of claim 1, wherein the seal body is made such that a portion of the seal body in the circumference direction is formed with grooves.

17. The sealed rolling bearing of claim 1, wherein the seal body is made such that a portion of the seal body in the circumference direction is provided with a weigth embedded therein.

18. The sealed rolling bearing of claim 1, wherein the inner rings in a pair having a contact surface portion through which the inner rings are engaged with each other, the seal space is formed on the outer diameter surface side of the contact surface portion of the inner rings, the seal body is formed with a base portion and a leg portion in a T-shape in cross section, such that the seal body has fulcrum in the leg portion in contact with the outer diameter surface of the inner rings at the contact surface portion, and provided with a weight on the radially outer side of the base portion, and the seal is formed on either side of the base portion of the seal body.

* * * * *